R. BROWNSON.
ASH SHOVEL.
APPLICATION FILED FEB. 2, 1909.
960,266.
Patented June 7, 1910.
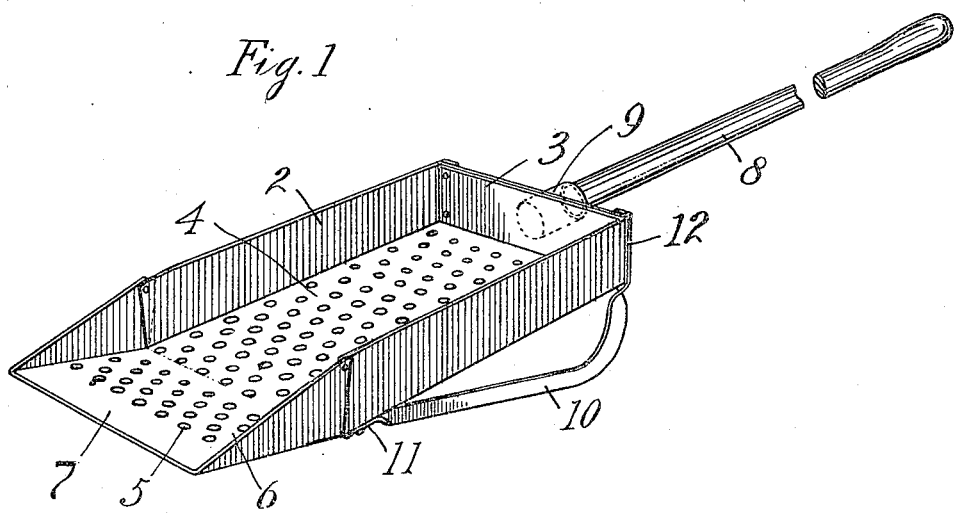
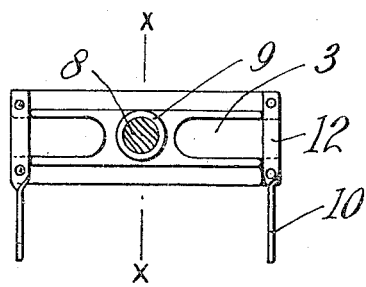
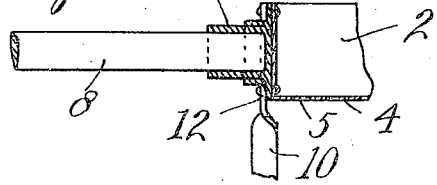
Witnesses,
George Voelker
A. S. Smith
Inventor,
Ralph Brownson
by Lothrop & Johnson
his Attorneys.

UNITED STATES PATENT OFFICE.

RALPH BROWNSON, OF ST. PAUL, MINNESOTA.

ASH-SHOVEL.

960,266. Specification of Letters Patent. Patented June 7, 1910.

Application filed February 2, 1909. Serial No. 475,629.

*To all whom it may concern:*

Be it known that I, RALPH BROWNSON, a citizen of the United States, residing at St. Paul, in the county of Ramsey and State of Minnesota, have invented certain new and useful Improvements in Ash-Shovels, of which the following is a specification.

My invention relates to improvements in ash sifting shovels its object being to provide a shovel designed for use in connection particularly with furnaces for removing the ashes and contained coal, its object being further to provide a shovel by which the ashes may be sifted from the coal before removal from the furnace, allowing the coal contained in the ashes to be removed and the shovel thereafter used to remove the ashes.

To this end my invention consists in the features of construction, combination and arrangement of parts hereinafter particularly described and claimed.

In the accompanying drawings forming part of this specification, Figure 1 is a perspective view of my improved invention; Fig. 2 is a rear end view of the shovel with the handle in section, and Fig. 3 is a section on line $x$—$x$ of Fig. 2.

In the accompanying drawings 2 and 3 represent the side and rear walls of the shovel and 4 the bottom formed with perforations 5. The forward end 6 of the bottom is upwardly inclined and has a solid free end 7.

8 represents a rearwardly extending handle suitably secured to the wall 3 as by being fitted in a socket piece 9 extending rearwardly from the center of the wall. Positioned underneath the shovel is a pair of rocker shoes 10, said shoes being secured at their front ends 11 to the bottom of the shovel directly at the rear of the inclined end 6 and being secured at their rear ends to the wall 3. The rear ends of the shoes are curved as shown in Fig. 1, the bottoms of said shoes forward of said curved portions alining with the bottom of the inclined end 6 of the shovel.

Thus in use with the lower straight edges of the shoes and the alining inclined portion 6 of the bottom resting upon the supporting surface, the shovel may be shoved through the ash pit door with the point of the shovel in contact with the floor of the ash pit. The shovel being filled with ashes and the handle lowered to horizontal position will raise the front end of the shovel thereby bringing the perforated bottom of the shovel sufficiently above the floor of the ash pit to allow the ashes to be sifted through as the shovel is reciprocated upon the shoes, leaving any coal in the shovel so it can be thrown back in the furnace. As the shovel is reciprocated upon the rear ends of the shoes the free end 6 of the shovel bottom will extend upwardly forming a front wall to prevent the ashes and coal being spilled over the front end of the shovel. It thus is possible with my improved shovel to insert the same into the ash pit and shake the ashes from the coal while the shovel is still in the pit. Thereafter when it is desired to remove the ashes the shovel can be used in the ordinary manner to remove the ashes from the pit. The perforations are of a size which will allow the ashes to remain in the shovel and be lifted thereby without falling through the perforations unless the ashes are agitated by the reciprocation of the shovel.

I claim as my invention:

In combination a shovel provided with side and rear walls and a perforated bottom, an upwardly inclined free end for said perforated bottom and a shoe portion comprising a pair of bars 10, each connected at its front end underneath said bottom at the rear of said inclined free end and extending rearwardly in alinement with said free end to the rear of said bottom, being then bent upwardly and connected with the rear wall of said shovel to form rocker shoes in the manner set forth.

In testimony whereof I affix my signature in presence of two witnesses.

RALPH BROWNSON.

Witnesses:
 H. S. JOHNSON,
 H. SMITH.